US009655304B2

(12) United States Patent
Hashimoto

(10) Patent No.: US 9,655,304 B2
(45) Date of Patent: May 23, 2017

(54) PLANT CULTIVATION CONTAINER

(75) Inventor: Masaki Hashimoto, Ibaraki (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 409 days.

(21) Appl. No.: 13/511,492

(22) PCT Filed: Nov. 30, 2010

(86) PCT No.: PCT/JP2010/071367
§ 371 (c)(1),
(2), (4) Date: Aug. 13, 2012

(87) PCT Pub. No.: WO2011/065566
PCT Pub. Date: Jun. 3, 2011

(65) Prior Publication Data
US 2012/0297677 A1  Nov. 29, 2012

(30) Foreign Application Priority Data
Nov. 30, 2009 (JP) .................................. 2009-272837

(51) Int. Cl.
*A01G 9/02* (2006.01)
*A01G 1/00* (2006.01)
*E04D 11/00* (2006.01)

(52) U.S. Cl.
CPC ............... *A01G 1/007* (2013.01); *A01G 9/02* (2013.01); *E04D 11/002* (2013.01); *Y02B 80/32* (2013.01)

(58) Field of Classification Search
CPC .......... A01G 1/007; A01G 9/02; A01G 9/027; A01G 9/028; A01G 9/045; A01G 9/025; Y02B 80/32

(Continued)

(56) References Cited

U.S. PATENT DOCUMENTS 4,887,388 A * 12/1989 Waltel, Jr. .......................... 47/79
4,926,586 A *  5/1990 Nagamatsu ........... E04D 11/002
                                                              47/65.9

(Continued)

FOREIGN PATENT DOCUMENTS

EP          0204883         12/1986
FR          2929632 A1 * 10/2009  ........... E04D 11/002

(Continued)

OTHER PUBLICATIONS

U.S. Appl. No. 13/512,096 to Masaki Hashimoto et al., which was filed May 25, 2012.

(Continued)

*Primary Examiner* — Son T Nguyen
(74) *Attorney, Agent, or Firm* — Greenblum & Bernstein, P.L.C.

(57) ABSTRACT

A plant cultivation container is provided which does not need a feed-water tube made of a porous material or the like but the plant cultivation bed material can be made permeated in a relatively short time period. For this purpose, a water reservoir portion for pooling plant cultivation water is provided, the water reservoir portion having a bed material accommodation part for placing a water-absorbing plant cultivation bed material. In the plant cultivation container, the water reservoir portion is provided with a surrounding feed-water channel that surrounds an entire circumference of the bed material accommodation part, and a feed-discharge channel for supplying the plant cultivation water from outside to the water reservoir portion and for discharging the plant cultivation water in the water reservoir portion to outside is provided in communication with the surrounding feed-water channel.

8 Claims, 8 Drawing Sheets

(58) Field of Classification Search
USPC .............. 47/65.9, 66.1, 66.5, 79, 85, 86, 87
See application file for complete search history.

(56) References Cited

U.S. PATENT DOCUMENTS

| | | | |
|---|---|---|---|
| 5,337,517 A * | 8/1994 | Karthauser et al. ............... 47/71 | |
| 5,409,510 A * | 4/1995 | Houweling .................... 47/62 C | |
| 6,237,285 B1 * | 5/2001 | Yoshida et al. ................. 47/65.9 | |
| 7,637,056 B2 * | 12/2009 | Tajima et al. .................. 47/65.9 | |
| D644,559 S | 9/2011 | Hashimoto | |
| D644,562 S | 9/2011 | Hashimoto | |
| 8,479,443 B2 * | 7/2013 | Buist ....................... A01G 1/007 47/65.9 | |
| 2007/0130828 A1 * | 6/2007 | Mathy ............................ 47/65.9 | |
| 2009/0260282 A1 * | 10/2009 | Hashimoto ............ A01G 9/045 47/20.1 | |
| 2009/0260284 A1 * | 10/2009 | Barbalho ....................... 47/65.9 | |
| 2010/0162623 A1 * | 7/2010 | Mathy ............................ 47/65.9 | |

FOREIGN PATENT DOCUMENTS

| | | |
|---|---|---|
| JP | 62-126916 | 6/1987 |
| JP | 63-31724 | 3/1988 |
| JP | 8-116811 | 5/1996 |
| JP | 10178913 A * | 7/1998 |
| JP | 11-75562 | 3/1999 |
| JP | 2001-078594 | 3/2001 |
| JP | 2001-86874 | 4/2001 |
| JP | 2001-204259 | 7/2001 |
| JP | 2008-148560 | 7/2008 |
| JP | 2009-165400 | 7/2009 |
| WO | 2006/106243 | 10/2006 |

OTHER PUBLICATIONS

Office Action issued in European Patent Office (EPO) Counterpart Patent Appl. No. 10833410.3, dated Jun. 3, 2016.

* cited by examiner (a)    (b)

PLANT CULTIVATION CONTAINER

TECHNICAL FIELD

The present invention relates to a plant cultivation container which communicates with an inlet for receiving plant cultivation water supplied from outside and an outlet for discharging the plant cultivation water to outside, and has a water reservoir portion for pooling the plant cultivation water, the water reservoir portion having a bed material accommodation part for placing a water-absorbing plant cultivation bed material.

BACKGROUND ART

As prior art documents for this type of the plant cultivation container, there can be mentioned Patent Document 1 which is shown below. The plant cultivation container described in Patent Document 1 is constituted of a unit including a feed-water tray and a plant cultivation box placed on the feed-water tray, and a plurality of the feed-water trays are connectable in front-rear and lateral directions by joints. A bottom portion of the plant cultivation box is divided into four rectangular portions by feed-water tubes extending in a shape of a cross, and at a center of each of the rectangular portions, a container shaped protrusion is formed downward. The plant cultivation bed material is placed inside the protrusions of the plant cultivation box and on the entire bottom portion, and soil is placed on the plant cultivation bed material. The plant cultivation water supplied by the feed-water tube permeates the plant cultivation bed material placed in the bottom portion, through a porous wall face of the feed-water tube. Accordingly, the feed-water tube is positioned below the soil and the plant cultivation bed material and cannot be basically seen during growth. In a case of a large amount of rainfall, rainwater penetrated through the soil and the plant cultivation bed material is accumulated at the bottom portion of the feed-water tray, and when the plant cultivation box is in dry state, through slits formed in a lowest part of the protrusion, rainwater permeates the plant cultivation bed material in the protrusion.

CITATION LIST

Patent Literature

Patent Document 1: Japanese Unexamined Patent Application Publication No. 8-116811 (paragraphs 0034-0036 and FIGS. 1 and 6)

SUMMARY OF INVENTION

Technical Problem

However, in the plant cultivation container described in Patent Document 1, it is necessary to provide a special feed-water tube made of a porous material, aside from the feed-water tray container and the plant cultivation box forming the unit. In addition, since the plant cultivation container adopts the configuration in which the plant cultivation water seeps from the porous wall face of the feed-water tube and permeates the plant cultivation bed material, there have been problems that it takes a long time for most of the plant cultivation bed materials to be permeated, or that, depending on the type of the plant to be grown, necessary portions of the plant cultivation bed material to be permeated does not tend to be satisfactorily permeated.

Therefore, with the view toward solving the problems of the plant cultivation container according to the prior art illustrated above, an object of the present invention is to provide a plant cultivation container which does not need a special feed-water tube made of a porous material and most of or necessary portions of the plant cultivation bed materials can be satisfactorily permeated in a relatively short time period.

Solution to Problem

The first feature of the plant cultivation container according to the present invention lies in that the plant cultivation container includes: a water reservoir portion for pooling plant cultivation water, the water reservoir portion having a bed material accommodation part for placing a water-absorbing plant cultivation bed material, wherein the water reservoir portion is provided with a surrounding feed-water channel that surrounds an entire circumference of the bed material accommodation part, and a feed-discharge channel for supplying the plant cultivation water from outside to the water reservoir portion and for discharging the plant cultivation water in the water reservoir portion to outside is provided in communication with the surrounding feed-water channel.

In the plant cultivation container according to the first feature of the present invention, the plant cultivation water from outside immediately reaches the bed material accommodation part of the water reservoir portion through the feed-discharge channel, and there is no need to provide a special feed-water tube made of a porous material. In addition, the plant cultivation water supplied through the feed-discharge channel continuously enters the surrounding feed-water channel that surrounds the entire circumference of the bed material accommodation part, and thus effects can be obtained in that, the entire circumference of the plant cultivation bed material is surrounded with the plant cultivation water in a relatively short time period from the beginning of the plant cultivation water supply, and most of or necessary portions of the plant cultivation bed materials can be satisfactorily permeated in a relatively short time period. It should be noted that, the plant cultivation container according to the present invention can be also used by connecting a plurality of the plant cultivation containers to one another, and in this case, the plant cultivation water supplied at a speed above a water absorption speed of the plant cultivation bed material is supplied through the feed-discharge channel to the downstream plant cultivation container.

Another feature of the present invention lies in that the surrounding feed-water channel is provided with a first weir member for controlling a circulation direction of the plant cultivation water.

With this configuration, the plant cultivation water which tends to flow into in one circulation direction is dammed up by the first weir member, and the plant cultivation water tends to enter the surrounding feed-water channel in the other circulation direction. Therefore, the entire circumference of a lower end portion of the plant cultivation bed material tends to be rapidly surrounded with the plant cultivation water. As a result, most of the plant cultivation bed materials can be appropriately moistened in a shorter period of time.

Another feature of the present invention lies in that the feed-discharge channel is in a shape of a groove disposed adjacent to one side of the water reservoir portion.

With this configuration, a condition of the plant cultivation water introduced through the feed-discharge channel can be observed and visually checked through flowers, leaves or the like of the flowering plants, on lateral sides of the plant cultivation bed material, without being hidden under the plant cultivation bed material. In other words, it can be visually determined whether or not the plant cultivation water is appropriately supplied, whether or not the plant cultivation water leaks between the connected plant cultivation containers, whether or not the plant cultivation water discharged from the plant cultivation container is abnormally contaminated, and the like. As a result, management of the plants is facilitated.

Another feature of the present invention lies in that the plant cultivation container further includes: a second weir member for dividing the feed-discharge channel into a first channel on an upstream side and a second channel on a downstream side in a water flow direction; and a partition wall for partitioning the feed-discharge channel and the water reservoir portion, wherein in the partition wall, a first opening for allowing the first channel of the feed-discharge channel to communicate with an upstream side of the surrounding feed-water channel and a second opening for allowing the second channel of the feed-discharge channel to communicate with a downstream side of the surrounding feed-water channel are formed at a distance from each other.

With this configuration, the plant cultivation water supplied to the feed-discharge channel enters the upstream side of the surrounding feed-water channel from the feed-discharge channel on the upstream side, circulates around the plant cultivation bed material, reaches the downstream side of the surrounding feed-water channel, and then returns to the feed-discharge channel on the downstream side. In this manner, since the entire circumference of the lower end portion of the plant cultivation bed material is rapidly surrounded with the plant cultivation water, most of the plant cultivation bed materials are moistened in a shorter period of time. In addition, after the plant cultivation bed material reached a steady state in which it is satisfactorily moistened, the entire plant cultivation water supplied thereafter does not directly flow out to the downstream plant cultivation container but enters the surrounding feed-water channel. Therefore the replacement of the plant cultivation water in the water reservoir portion with fresh water is facilitated.

Another feature of the present invention lies in that the water reservoir portion is formed of two water reservoir portions arranged side by side so that the water reservoir portions are opposed across the feed-discharge channel.

With this configuration, the feed-discharge channel runs between two water reservoir portions arranged side by side and therefore, when the planted flowering plants have grown up to fully cover the range, the feed-discharge channel can be seen only between the flowering plants planted in at least two of the plant cultivation bed materials. Therefore, an appearance of the flower bed formed of the plant cultivation containers that have received the flowering plants is further improved.

Another feature of the present invention lies in that a plurality of the water reservoir portions are arranged adjacent to each other along the feed-discharge channel, and between the adjacent water reservoir portions, a third weir member for pooling the plant cultivation water is provided.

With this configuration, even if the plant cultivation container is placed on a part of an inclined floor face, such as a rooftop of a building, there can be suppressed a tendency of the supplied plant cultivation water to flow toward the water reservoir portion on a lower side positioned downstream of the feed-discharge channel due to an own weight of the plant cultivation water, and the entire circumference of the lower end portion of the plant cultivation bed material on the upstream side can be rapidly surrounded with the plant cultivation water. Therefore, the plant cultivation bed materials placed in each of the upstream and downstream water reservoir portions can be appropriately moistened uniformly and efficiently.

Another feature of the present invention lies in that the plant cultivation container further includes: a second weir member for dividing the feed-discharge channel into a first channel on an upstream side and a second channel on a downstream side in a water flow direction; and a partition wall for partitioning the feed-discharge channel and the water reservoir portion, wherein in the partition wall, a first opening for allowing the first channel of the feed-discharge channel to communicate with the water reservoir portion on the upstream side and a second opening for allowing the second channel of the feed-discharge channel to communicate with the surrounding feed-water channel on the downstream side are formed.

With this configuration, in the case where a plurality of the water reservoir portions are arranged adjacent to each other and along the feed-discharge channel, the plant cultivation water supplied to the feed-discharge channel first enters the surrounding feed-water channel of the upstream water reservoir portion from the feed-discharge channel on the upstream side, circulates around the plant cultivation bed material, enters the surrounding feed-water channel of the upstream water reservoir portion, again circulates around the plant cultivation bed material, and then returns to the feed-discharge channel on the downstream side. In this manner, since the entire circumference of the lower end portion of the plant cultivation bed material on each of the upstream and downstream sides is rapidly surrounded with the plant cultivation water, most of the plant cultivation bed materials are moistened in a shorter period of time. In addition, after the plant cultivation bed material reached a steady state in which it is satisfactorily moistened, the entire plant cultivation water supplied thereafter does not directly flow out to the downstream plant cultivation container but enters the surrounding feed-water channel of each water reservoir portion. Therefore the replacement of the plant cultivation water in the water reservoir portion with fresh water is facilitated.

Another feature of the present invention lies in that the plant cultivation container further includes an engaging portion for additionally and removably attaching an auxiliary weir at a position adjacent to the third weir member on an upstream side or downstream side thereof.

With this configuration, the auxiliary weir is additionally attached in accordance with a degree of a slope of the floor face where the plant cultivation container is placed (with the proviso that the height is above a height of the third weir member), and even when the degree of the slope of the floor face is large, an appropriate water feed function can be attained.

Another feature of the present invention lies in that a weir member for pooling the plant cultivation water in the water reservoir portion on the downstream side is provided between the second opening and the second channel.

With this configuration, when the plant cultivation container is placed on the floor face with a relatively steep slope, a deficiency of the pooled water in the downstream water reservoir container as compared with the upstream water reservoir container is suppressed, and thus the water feed state between the upstream water reservoir container and the downstream water reservoir container becomes more uniform, and thus uniformalization of growth conditions of the plants is facilitated.

DESCRIPTION OF EMBODIMENTS

Hereinbelow, embodiments of the present invention will be described with reference to the drawings.

Figure 1:
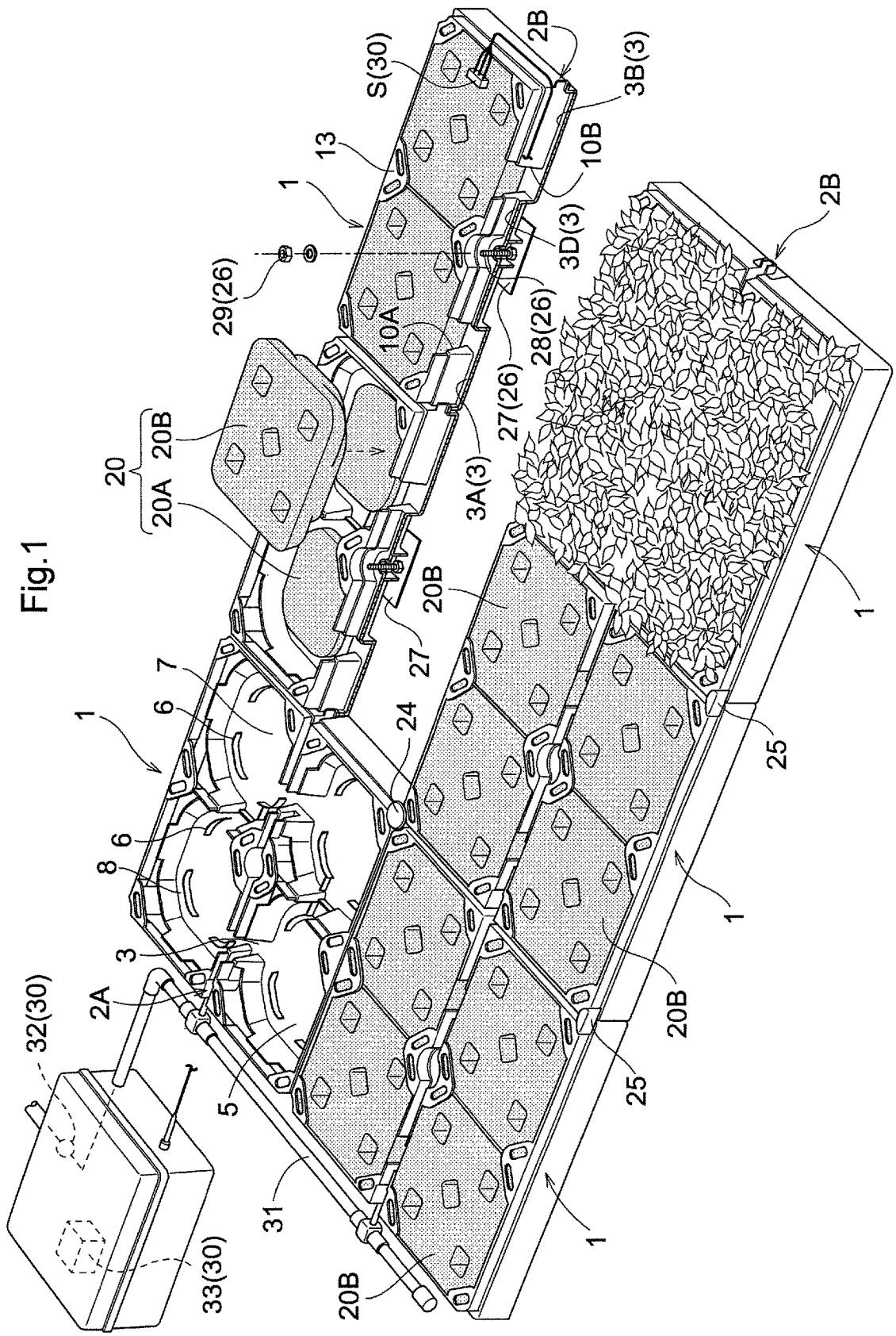
FIG. 1 is a partially cutaway perspective view of an example of a flower bed formed of plant cultivation containers according to the present invention.

FIG. 1 is one example of the plant cultivation device placeable outdoors, such as on a roof top of a building, and includes: a plurality of plant cultivation containers 1 each integrally formed of resin; plant cultivation bed materials 20 each disposed in the plant cultivation container 1; and a feed-water equipment 30 for supplying the plant cultivation water to the plant cultivation containers 1.

(Configuration of Plant Cultivation Container)

Figure 2:
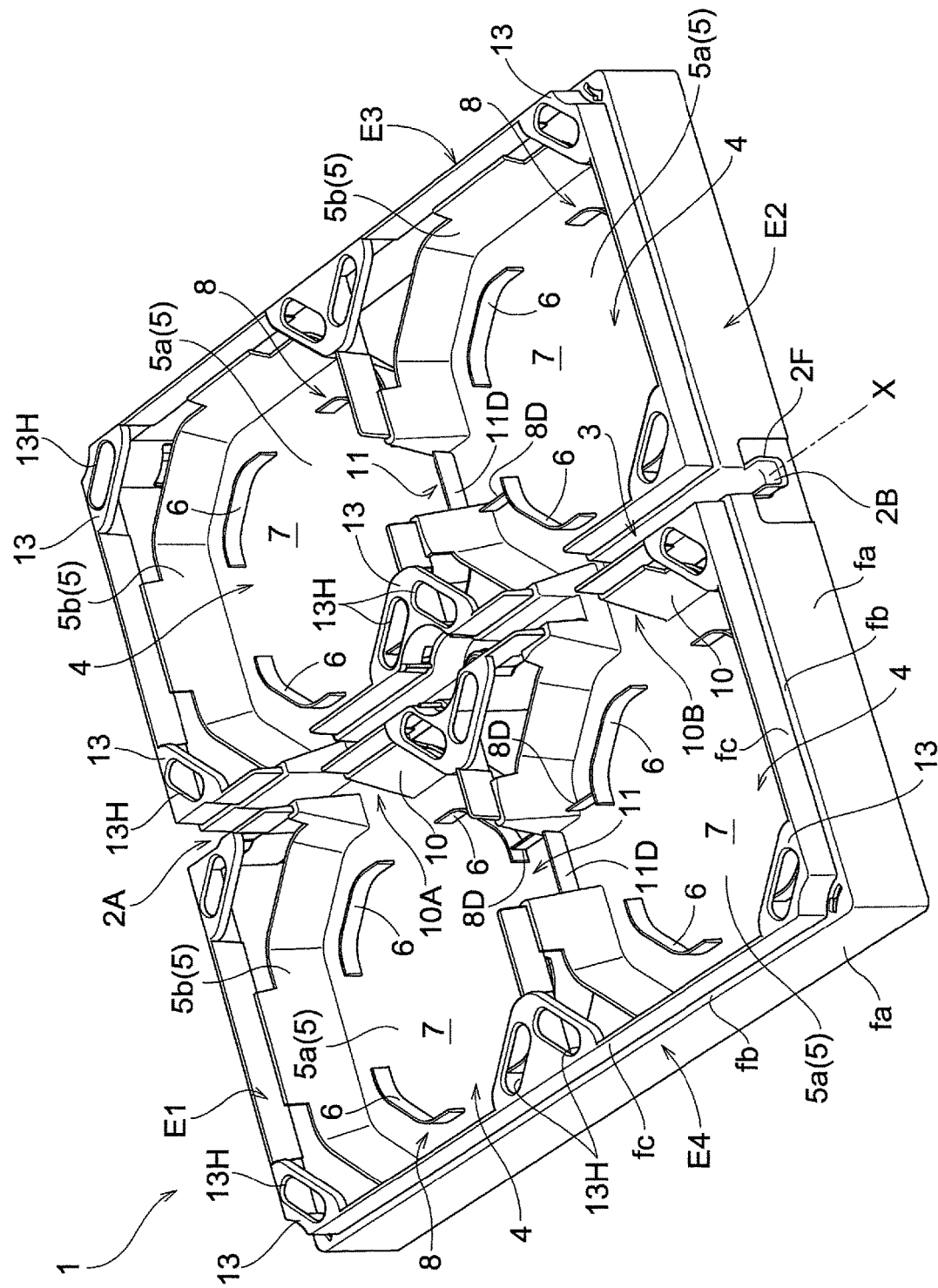
FIG. 2 is a perspective view of the plant cultivation container according to the present invention.

As shown in FIG. 2, each of the plant cultivation containers 1 has an outer shape of an approximate square as a planar view. At a center of a plate-shaped first side member E1 constituting one side of the plant cultivation container 1, a water inlet 2A is provided which is for receiving the plant cultivation water into the plant cultivation container 1. At a center of a second side member E2 opposite to the first side member E1, a water outlet 2B is provided which is for discharging excessive plant cultivation water from the plant cultivation container 1.

An axis X connecting midpoints of the two side members E1,E2 extends at the center of the plant cultivation container 1 in parallel with remaining side members E3,E4, and a linear feed-discharge channel 3 runs along the axis X. The water inlet 2A and the water outlet 2B are positioned at both ends of the feed-discharge channel 3, and a beak-shaped slice 2F projects nearly horizontally from the water outlet 2B.

In FIG. 2, on each of a right side and a left side of the feed-discharge channel 3, two approximate square-shaped plant cultivation sections 4 are arranged along and in parallel with the feed-discharge channel 3. Four in total of the plant cultivation sections 4 collectively form the plant cultivation container 1 having an outer shape of an approximate square as a whole, as a planar view.

Figure 5:
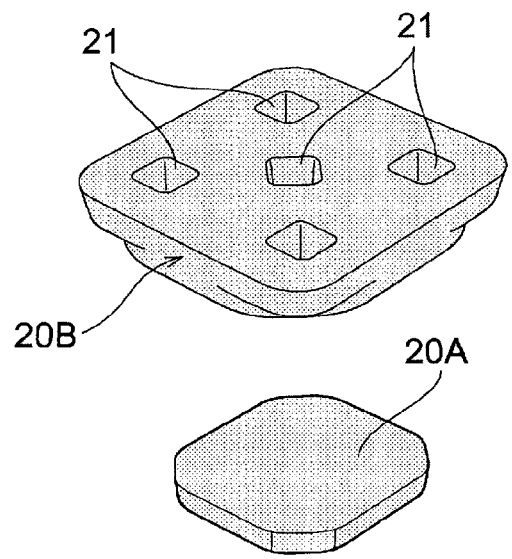
FIG. 5 is a perspective view of a plant cultivation bed material used in the present invention.

The plant cultivation bed material 20 is formed of a porous material having a function of supporting the plant while allowing growth of its root, and a function of absorbing and holding the plant cultivation water necessary for growth. As shown in FIGS. 1 and 5, herein, the plant cultivation bed material 20 includes: a lower bed material 20A for absorbing the fed plant cultivation water; and an upper bed material 20B which is placed on the lower bed material 20A and supports a plant. In the upper bed material 20B, a recess 21 is formed which is for planting a seedling of, for example, flowering plant. The plant cultivation bed material 20 (20A, 20B) used herein is formed of a mixture of urethane, crushed wood chips and the like, and is configured to hold moisture and air in a balanced manner, nearly uniformly from top to bottom, and at the same time, to facilitate the holding of air necessary for the growth of the root.

Figure 3:
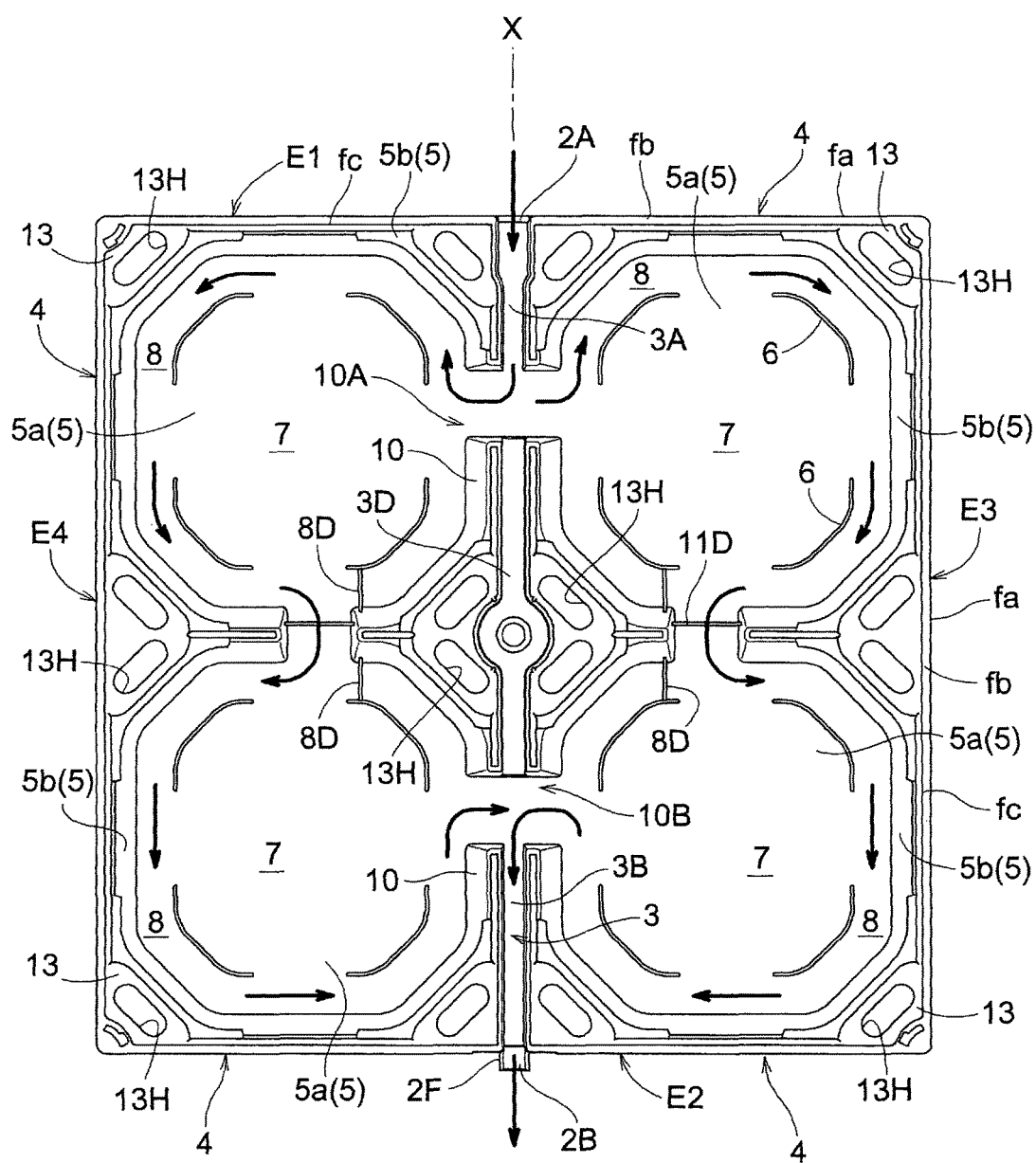
FIG. 3 is a plan view showing an action in the plant cultivation container of FIG. 2.

As shown in FIGS. 2 and 3, each of the plant cultivation sections 4 is provided with a single water reservoir container 5 (one example of water reservoir portion) for pooling the plant cultivation water. Therefore, the feed-discharge channel 3 serves a groove-shaped feed-discharge channel disposed next to one side of each water reservoir container 5, and the two water reservoir containers 5 are arranged on the right and left sides of and next to the feed-discharge channel 3 so that they are opposed across the feed-discharge channel 3. The water reservoir container 5 has eight wall faces 5b extending obliquely upward from an outermost periphery of an approximate octagonal bottom face 5a, to form a mortar shape. The water reservoir container 5 is connected to the side members E1,E2,E3,E4 through only upper ends of the four wall faces 5b extending in approximate parallel with any of the four side members E1,E2,E3,E4 from among the eight wall faces 5b.

Four low plate-shaped projections 6 stand upward at positions closer to the center by a predetermined distance from the outermost periphery of the bottom face 5a of the water reservoir container 5.

An approximately octagonal area inside the plate-shaped projection 6 forms a bed material accommodation part 7 for placing the lower bed material 20A. One of roles of the plate-shaped projection 6 is to fix the lower bed material 20A to a proper position at the center of the bottom face 5a in a proper posture, by fixing a lower end portion of the lower bed material 20A to the inside of the plate-shaped projections 6 in a manner nearly fitted thereinto.

An outside of the plate-shaped projection 6 forms a surrounding feed-water channel 8 surrounding an entire circumference of the lower end portion of the lower bed material 20A. In the surrounding feed-water channel 8, the lower bed material 20A is not present, and thus basically the plant cultivation water freely moves to and fro.

It should be noted that, as a planar view, the upper bed material 20B has a larger outer diameter than that of the lower bed material 20A, and when the upper bed material 20B is placed on the lower bed material 20A, an outer periphery of the upper bed material 20B is positioned so as to be nearly fitted into an inner face of the eight wall face 5b of the water reservoir container 5.

Accordingly, beneath the upper bed material 20B, a tunnel-shaped water channel that surrounds an entire circumference of the lower bed material 20A is formed.

Figure 4:
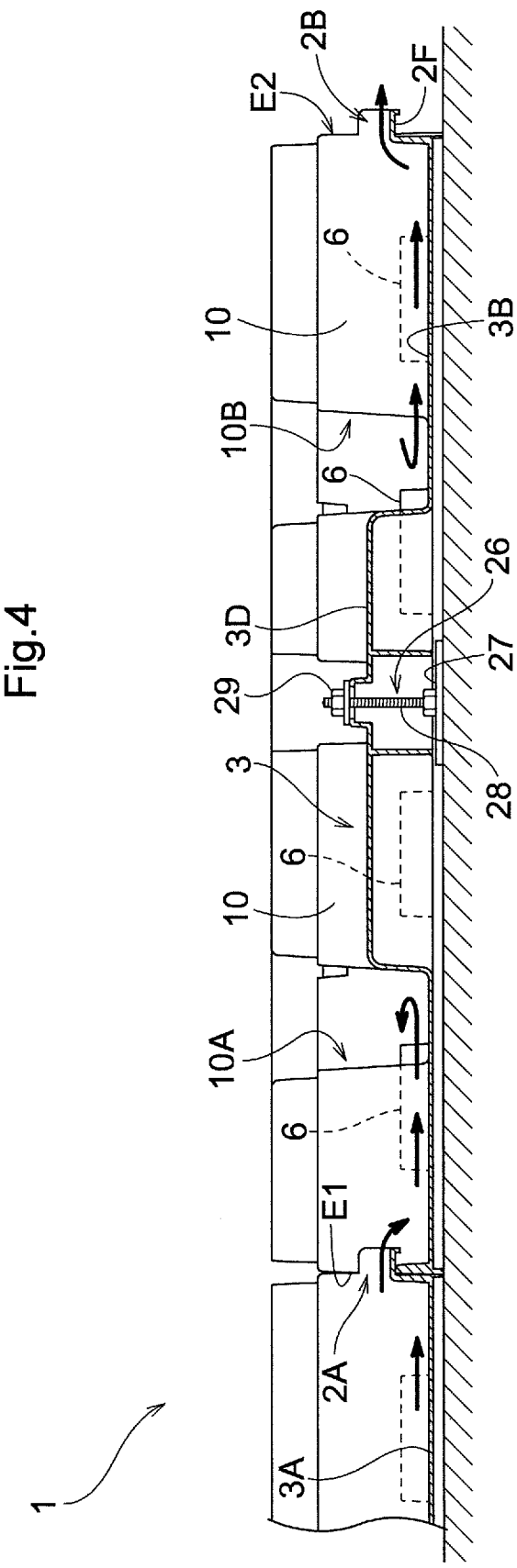
FIG. 4 is a vertical cross-sectional view taken along a feed-discharge channel of the plant cultivation container of FIG. 2.

As shown in FIG. 4, in a intermediate portion in a water flow direction of the feed-discharge channel 3, there is formed a second weir member 3D which divides the feed-discharge channel 3 into a first channel 3A on an upstream side and a second channel 3B on a downstream side, and pools the plant cultivation water to a predetermined depth in the first channel 3A.

In addition, as shown in FIGS. 2-4, between the feed-discharge channel 3 and the water reservoir container 5, there is provided a plate-shaped partition wall 10 for partitioning two regions. The partition wall 10 is provided with: a first opening 10A for allowing the first channel 3A of the feed-discharge channel 3 to communicate with the surrounding feed-water channel 8 of the plant cultivation section 4 on the upstream side; and a second opening 10B for allowing the second channel 3B of the feed-discharge channel 3 to communicate with the surrounding feed-water channel 8 of the plant cultivation section 4 on the downstream side, both openings formed in a shape of cut-out. The second weir member 3D having a certain length extends linearly from a downstream end portion of the first opening 10A to an upstream end portion of the second opening 10B.

Between the water reservoir container 5 on the upstream side and the water reservoir container 5 on the downstream side which are disposed along and in parallel with the feed-discharge channel 3, a connection opening 11 for allowing the plant cultivation water to move to and fro is formed, and in the connection opening 11, a third weir member 11D is formed for pooling the plant cultivation water to a predetermined depth.

A part of each surrounding feed-water channel 8 is provided with a first weir member 8D for controlling a circulation direction of the plant cultivation water entering the surrounding feed-water channel 8 from the water inlet 2A through the first opening 10A or the second opening 10B.

The two first weir members 8D provided in the surrounding feed-water channels 8 of the water reservoir containers 5 on the upstream and downstream sides extend in parallel with the axis X, in the same manner in a front-rear direction across the third weir member 11D, and are arranged symmetrically about the third weir member 11D as a planar view.

Referring to FIG. 3, when the description is made with respect to only the plant cultivation sections 4 on the right side of the axis X, the first weir member 8D provided in the upstream water reservoir container 5 is configured so as to connect a portion near a downstream end portion of the plate-shaped projection 6 located on a lower left side in the drawing with the closest wall face 5b. The first weir member 8D provided in the downstream water reservoir container 5 is configured so as to connect a portion near an upstream end portion of the plate-shaped projection 6 located on an upper left side in the drawing with the closest wall face 5b.

It should be noted that, the position of the first weir member 8D is not specifically limited, as long as the circulation of the plant cultivation water is controlled. For example, the first weir member 8D may be disposed at a position closer to the first opening 10A or the second opening 10B, than the position illustrated in FIG. 3.

On upper ends of respective four corners of each plant cultivation section 4, respective approximately triangular flanges 13 extend horizontally so as to fill the four corners. Lower faces of the respective flanges 13 are configured to engage with four sides of an upper face of the upper bed material 20B, and thus function to hold the upper bed material 20B to a proper position.

In addition, in a case where a great number of the plant cultivation containers 1 are connected in four directions, a worker can walk along and on at least a part of the flanges 13 for the purpose of maintenance of the flowering plants during growth. The feed-discharge channel 3 may be used in a closed state in which the channel is closed with a removable rectangular lid (not shown).

In each flange 13, an oval through hole 13H extends in parallel with an oblique short side of the bottom face 5a. In addition, the flange 13 is positioned higher than a height level of an upper end of the wall face 5b of the water reservoir container 5, and between the flange 13 and the wall face 5b, a gap is formed which extends in parallel with the through hole 13H. Though these gaps and the through holes 13H, a surface such as floor on which the plant cultivation container 1 is placed can be seen.

(Connection of Containers)

FIG. 1 shows two types of connection caps 24, 25 for achieving the connection of the plant cultivation containers 1 to one another. The circular connection cap 24 is used for unifying the four plant cultivation containers 1, while the semicircular connection cap 25 is used for unifying the two plant cultivation containers 1. In order to lock lower end portions or the like of the connection caps 24,25, each of the four corner portions of the plant cultivation container 1 has an engagement hole or engagement projection in a shape of a quadrant.

For example, when the four plant cultivation containers 1 are arranged in a square shape as a whole, the four engagement holes are arranged to form a circle as a whole at the center of the square. By locking the circular connection cap 24 along this circule, the four plant cultivation containers 1 are unified. When the two plant cultivation containers 1 are arranged in the front-rear direction or a lateral direction, the two engagement holes are arranged to form a single semi-circle as a whole. By locking the semicircular connection cap 25 along this semicircle, the two plant cultivation containers 1 are unified.

As shown in FIG. 4, when the plant cultivation containers 1 are connected in the front-rear direction, i.e. connected in such a manner that the feed-discharge channels 3 are arranged in series, the connection is made in such a manner that the slice 2F provided on the water outlet 2B of the plant cultivation container 1 on the upstream side in the flow direction of the plant cultivation water enters the water inlet 2A of the plant cultivation container 1 on the downstream side.

A relationship in height of the weir members, the plate-shaped projection 6 and the slice 2F, when the plant cultivation container 1 is placed on a horizontal plane, is set as follows: second weir member 3D>slice 2F>third weir member 11D=water inlet 2A>plate-shaped projection 6>first weir member 8D.

As shown in FIG. 1, each of the plant cultivation containers 1 can be fixed to a floor face or the like of a rooftop of a building. FIG. 1 illustrates a case where a fastening tool 26 is used which includes a bolt 28 standing on an upper face of a base plate 27. A head part of the bolt 28 is welded to the base plate 27. The base plate 27 is fixed to a desired part of a floor face in advance with an adhesive, a double-stick tape, another anchor bolt (not shown) or the like, the bolt 28 is inserted into a fixing hole 14 formed in the center of the plant cultivation container 1 (corresponding to a part of the second weir member 3D), and then the plant cultivation container 1 is fixed to the fastening tool 26 by fastening a nut 29 screwed on the bolt 28.

As shown in FIG. 1, the feed-water equipment 30 includes: piping 31 for supplying the plant cultivation water to the water inlet 2A of the plant cultivation container 1 disposed most upstream; an electromagnetic valve 32 disposed between waterworks and the piping 31; a moisture sensor S inserted into the upper bed material 20B positioned most downstream; and the controller 33 for switching ON and OFF of the electromagnetic valve 32 based on detection result of the moisture sensor S.

Each of the side members E1,E2,E3,E4 includes: a main outer periphery fa linearly upward extending from a lowest part of the plant cultivation container 1; a shoulder portion fb extending inwardly from an upper end of the main outer periphery fa; and an auxiliary outer periphery fc linearly upward extending from the shoulder portion fb. The auxiliary outer periphery fc is positioned slightly inward of the main outer periphery fa.

In other words, when the plant cultivation containers 1 are connected in the front-rear direction (the feed-discharge channels 3 are arranged in series), the main outer periphery fa of the first side member E1 of the plant cultivation container 1 and another main outer periphery fa of the second side member E2 of the adjacent plant cultivation container 1 are brought into contact with or arranged next to each other. On the other hand, when the plant cultivation containers 1 are connected in the lateral direction (the feed-discharge channels 3 are arranged in parallel), the main outer periphery fa of the third side member E3 of the plant cultivation container 1 and another main outer periphery fa of the fourth side member E4 of the adjacent plant cultivation container 1 are brought into contact with or arranged next to each other.

Therefore, when the two plant cultivation containers 1 are connected, the water reservoir containers 5 neighboring across the side members E1,E2 or the side members E3,E4 are arranged apart from each other at a distance twice as long as a width of the shoulder portion fb.

The distance twice as long as the width of the shoulder portion fb is set to a value approximately the same as a width of the feed-discharge channel 3 or the like that separates two adjacent water reservoir containers 5 in the front-rear direction or the lateral direction in the plant cultivation container 1. Accordingly, when the plant cultivation containers 1 are connected in the front-rear direction or lateral direction, the adjacent upper bed materials 20B disposed in the respective plant cultivation sections 4 are arranged apart from each other at an approximately constant distance regardless of the arrangement directions, which distance is nearly the distance twice as long as the width of the shoulder portion fb.

(Action in Plant Cultivation Container)

Referring to FIG. 3, when the feed-water equipment 30 begins to supply the plant cultivation water to the water inlet 2A of the plant cultivation container 1 disposed most upstream, first, the plant cultivation water enters the first channel 3A of the feed-discharge channel 3, hit the second weir member 3D, and is separated to right and left. Through the right and left first openings 10A, the water enters the surrounding feed-water channels 8 (the water reservoir containers 5) of the right and left upstream plant cultivation sections 4. The plant cultivation water that has entered the surrounding feed-water channel 8 flows through either or both of the upstream side or the downstream side of the channel in accordance with a degree of a slope where the container is placed. However, after the plant cultivation water flowing through the downstream side reaches the first weir member 8D disposed in the surrounding feed-water channel 8, the water flowing through the upstream side becomes predominant, flows clockwise around outer circumferences of the lower bed material 20A and the plate-shaped projections 6 along the surrounding feed-water channel 8, and reaches the first weir member 8D, to thereby rapidly surround the entire circumference of the lower bed material 20A with the plant cultivation water. In this manner, the plate-shaped projection 6 also serves as a guide member for guiding the plant cultivation water in a given circulation direction. The lower bed material 20A immediately begins to absorb the plant cultivation water, but when the plant cultivation water is supplied at a rate above a speed of water absorption by the lower bed material 20A, the water overflows above the third weir member 11D and moves from the connection opening 11 to the downstream plant cultivation section 4.

It should be noted that, in this embodiment, the four water reservoir containers 5 (water reservoir portion) is included in a single plant cultivation container 1, but the two water reservoir containers 5 (water reservoir portion) provided in parallel with the axis X on the right or left side and connected with each other through the connection opening 11 may be considered as a single water reservoir container 5 (water reservoir portion). Accordingly, the plant cultivation container 1 is considered as having a configuration in which the feed-discharge channel 3 for supplying the plant cultivation water from outside to the water reservoir container 5 (water reservoir portion) and discharging the plant cultivation water in the water reservoir container 5 (water reservoir portion) to outside is provided in communication with the surrounding feed-water channel 8.

The plant cultivation water that has entered the surrounding feed-water channel 8 on the downstream plant cultivation section 4 flows clockwise about the outer circumference of the lower bed material 20A and the plate-shaped projections 6 along the surrounding feed-water channel 8 due to the presence of the first weir member 8D disposed on the downstream side of the channel, and reaches the first weir member 8D, to thereby rapidly surround the entire circumference of the lower bed material 20A with the plant cultivation water. A part of the plant cultivation water that has surrounded the lower bed material 20A enters the second channel 3B. The lower bed material 20A immediately begins to absorb the plant cultivation water, but when the plant cultivation water is supplied from the upstream plant cultivation section 4 at a rate above the speed of water absorption by the lower bed material 20A, the water overflows from the slice 2F of the water outlet 2B and flows into the water inlet 2A of the downstream plant cultivation container 1.

Such an action of the plant cultivation water is performed nearly symmetrically in the right and left plant cultivation sections 4 across the feed-discharge channel 3.

It should be noted that, a controller 33 may be set in such a manner that the extra plant cultivation water is not discharged from the slice 2F of the plant cultivation container 1 disposed most downstream. Alternatively, the water outlet 2B of the plant cultivation container 1 disposed most downstream may be closed with a special plug member.

Other Embodiments

Figure 6:
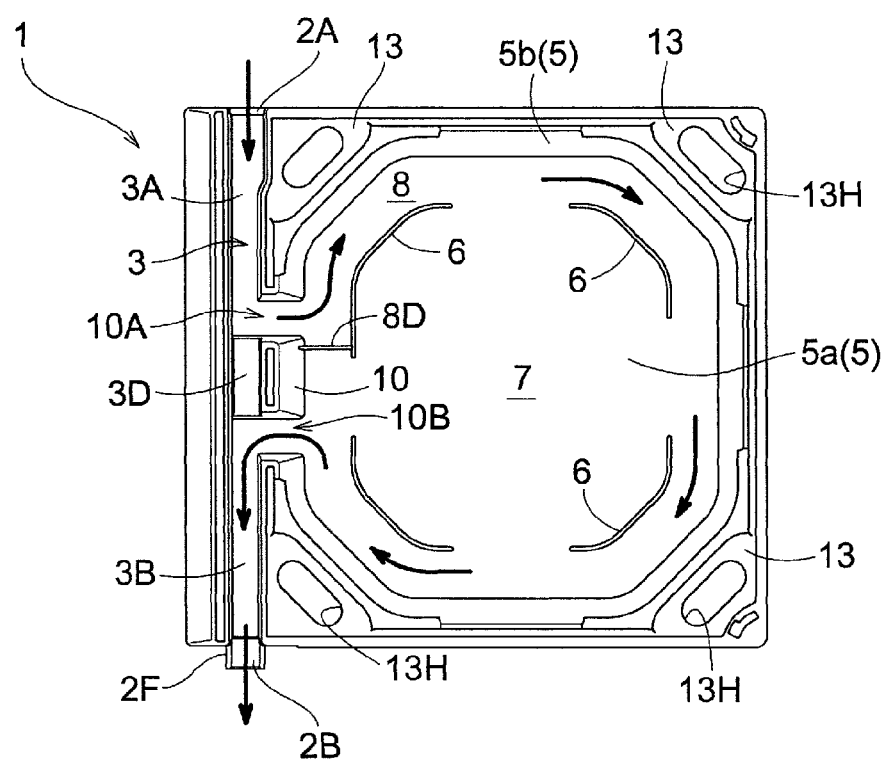
FIG. 6 is a plan view showing an action in the plant cultivation container according to another embodiment of the present invention.

<1> The plant cultivation section 4 may not be necessarily used as four sections connected together, and as shown in FIG. 6, the configuration may include the water reservoir container 5 formed of the single plant cultivation section 4 disposed next to one side of the feed-discharge channel 3. The upstream end portion of the second weir member 3D is neighboring to the upstream side of the surrounding feed-water channel 8 of the plant cultivation section 4, and the downstream end portion of the second weir member 3D is neighboring to the downstream side of the surrounding feed-water channel 8 of the plant cultivation section 4. Therefore, the first opening 10A and the second opening 10B are arranged at a sufficient distance apart from each other. Herein, the first weir member 8D provided in the plant cultivation section 4 extends from the downstream end portion of the upstream plate-shaped projection 6 to the upstream end portion of the partition wall 10 in such a manner that it crosses the axis X. Therefore, the plant cultivation water that has entered the surrounding feed-water channel 8 from the first opening 10A circulates clockwise about the outer circumference of the lower bed material 20A from the beginning due to the presence of the first weir member 8D and reaches a portion around the second opening 10B. It should be noted that, also in the embodiment of FIG. 2, the first weir member 8D provided in the upstream plant cultivation section 4 may extends from the downstream end portion of the upstream plate-shaped projection 6 to the wall face 5b forming the first opening 10A in such a manner that it crosses the axis X, like in FIG. 6.

Figure 7:
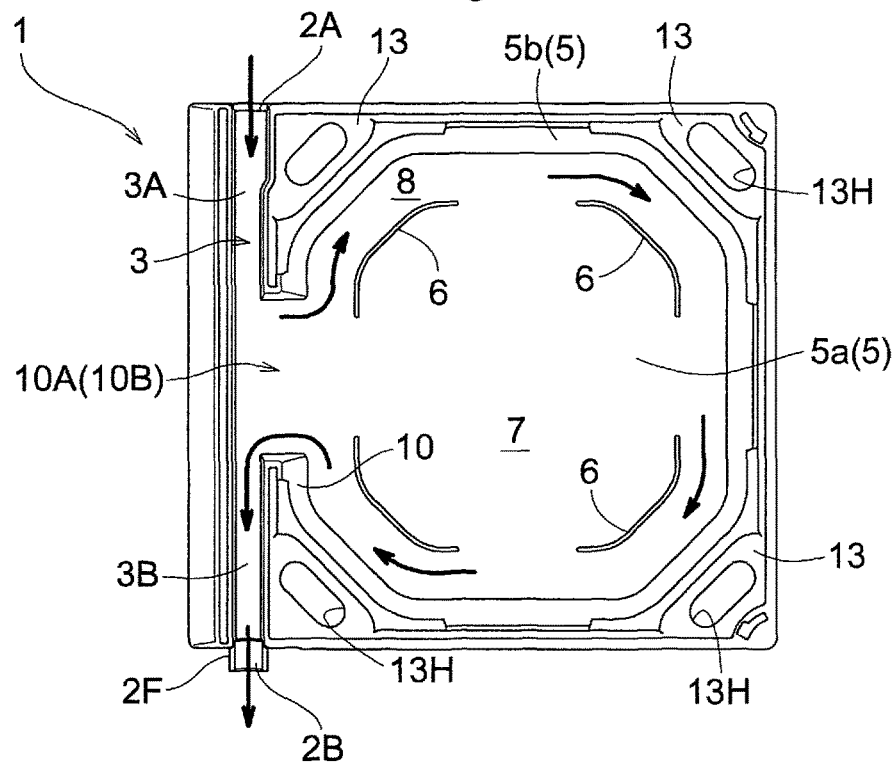
FIG. 7 is a plan view showing an action in the plant cultivation container according to still another embodiment.

<2> As shown in FIG. 7, the second weir member 3D may be omitted from the embodiment of FIG. 6. In the embodiment of FIG. 7, the second weir member 3D is omitted, only a single channel is present as the feed-discharge channel 3, and an entire length of the channel communicates with the surrounding feed-water channel 8. The plant cultivation water may not necessarily circulate clockwise in the surrounding feed-water channel 8 as shown in the drawing, but the effect is obtained in which the plant cultivation water that has entered the surrounding feed-water channel 8 surrounds the entire outer circumference of the lower bed material 20A, and excessive plant cultivation water is discharged from the surrounding feed-water channel 8 to the downstream plant cultivation container 1.

Figure 8:
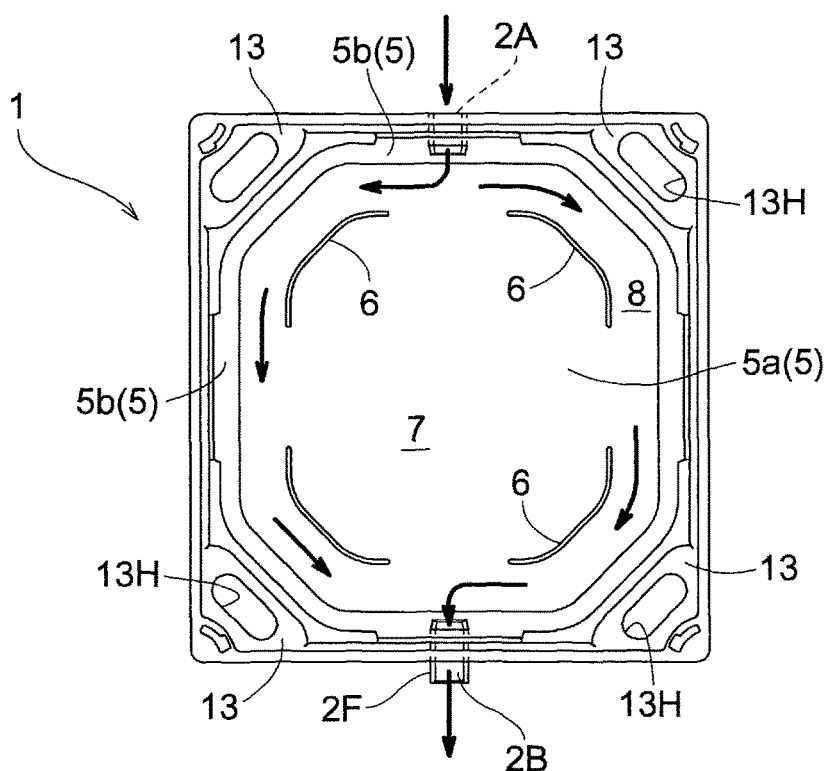
FIG. 8 is a plan view showing an action in the plant cultivation container according to still another embodiment.

<3> In the embodiment of FIG. 7, the feed-discharge channel 3 is arranged next to a side of the water reservoir container 5, but the feed-discharge channel 3 may be included in the water reservoir container 5, as shown in FIG. 8. In the embodiment of FIG. 8, the surrounding feed-water channel 8 surrounding the entire circumference of the bed material accommodation part itself serves as the feed-discharge channel.

<4> The plant cultivation bed material may be a single plant cultivation bed material in which the lower bed material 20A and the upper bed material 20B are integrally formed.

<5> The surface on which the plant cultivation container according to the present invention is placed is not limited to the inclined surface, but may be placed on a horizontal floor face or the ground. In addition, the configuration in use is not limited to a plurality of the plant cultivation container connected to one another, but a single plant cultivation container as-is may be used.

<6> The feed-water equipment 30 is not limited to the configuration described above, as long as the plant cultivation water can be appropriately supplied. For example, the equipment may not be connected to waterworks and water may be supplied from a feed-water tank. In addition, the control may not be performed based on the detection value of the sensor, but timings of water feed initiation and water feed termination may be automatically controlled using a timer set by a worker or the like.

Figure 9:
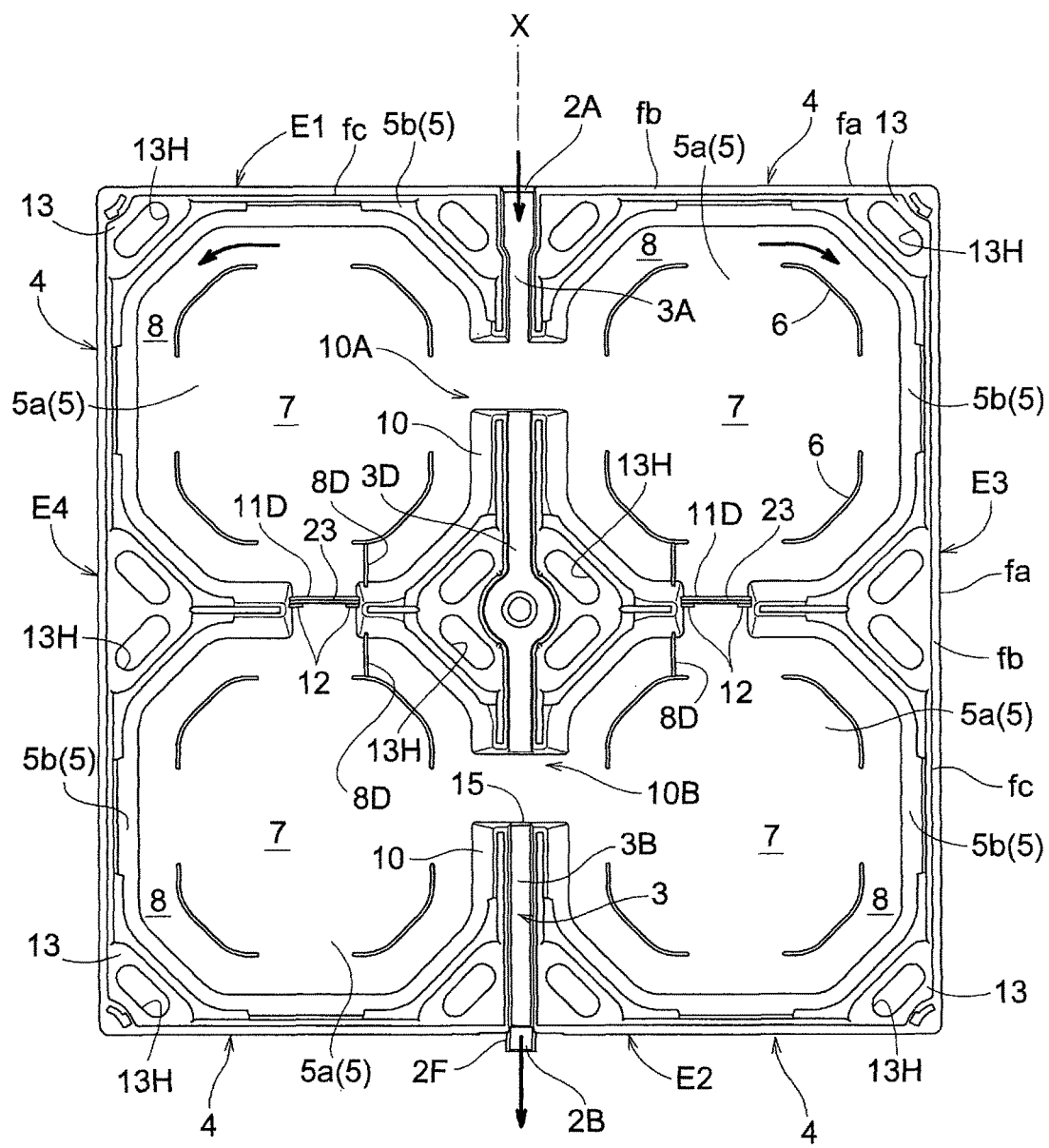
FIG. 9 is a plan view showing an action in the plant cultivation container according to still another embodiment.
Figure 10:
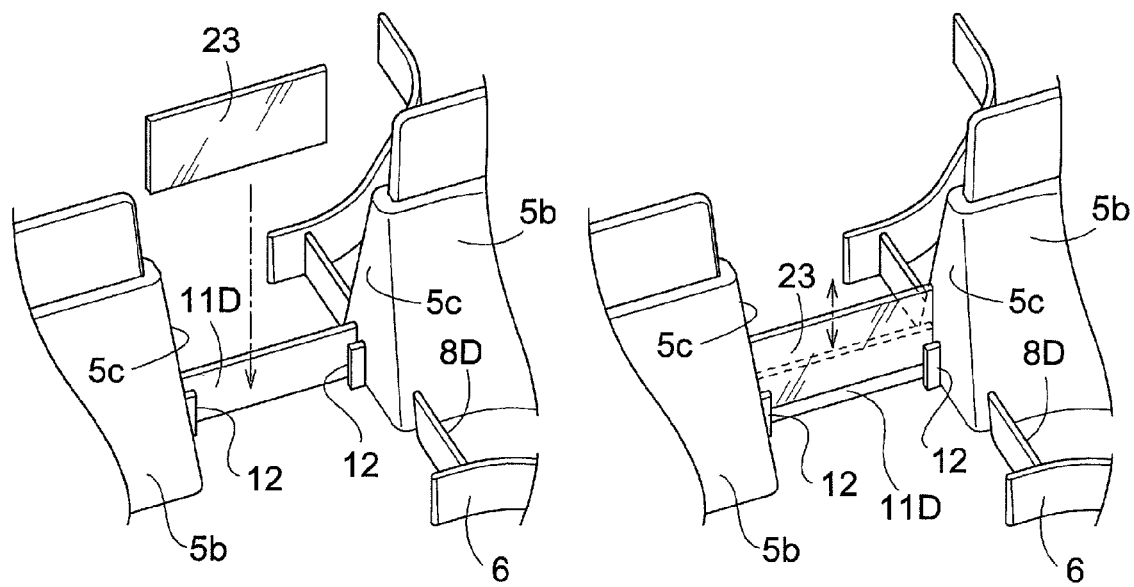
FIG. 10 is a perspective view of a specific portion of FIG. 9.

<7> As shown in FIGS. 9 and 10(*a*), at a position adjacent to the third weir member 11D on the upstream or downstream side of the third weir member 11D, a plate-shaped auxiliary weir 23 for minutely controlling a to-and-fro movement of the plant cultivation water between the upstream water reservoir container 5 and the downstream water reservoir container 5, may be additionally and removably provided as option member. Herein, for additionally attaching the plate-shaped auxiliary weir 23, a pair of engaging portions 12 are arranged adjacent to the third weir member 11D on the downstream side of the third weir member 11D.

The third weir member 11D connects lower portions of a pair of end faces 5c formed in the wall faces 5b for providing the connection opening 11 (in this regard, the third weir member 11D is the same as the embodiment shown in FIG. 2). A pair of the engaging portions 12 are a pair of rib-shaped members formed on respective lower ends of a pair of the end faces 5c, provided next to the third weir member 11D. Since the rib-shaped engaging portions 12 extend from a pair of the end faces 5c to a small degree, the engaging portion 12 alone does not have influence on the water flow. When the plate-shaped auxiliary weir 23 having a height above the height of the third weir member 11D is inserted into a vertical groove formed between the rib-shaped engaging portions 12 and the third weir member 11D, and a lower face of the auxiliary weir 23 is brought into close contact with bottom face of the plant cultivation container 1, the height of the weir that partitions the connection opening 11 can be appropriately changed.

In other words, the height of the third weir member 11D is set to a value suitable for a floor face with a relatively mild degree of the slope, and in a case where the plant cultivation container 1 is placed on the floor face with a steeper slope, an appropriate water feed function can be attained regardless of the degree of the slope, by inserting the auxiliary weir 23 having a height suitable for the degree of the slope.

It should be noted that, for example, when a width of the vertical groove formed between the rib-shaped engaging portions 12 and the third weir member 11D is set to a size approximately the same as a thickness of the auxiliary weir 23, and when the auxiliary weir 23 is configured in such a manner that the installed auxiliary weir 23 is brought into close contact with a face of the third weir member 11D, as shown in FIG. 10(*b*), the auxiliary weir 23 can be appropriately moved upward or downward and fixed at a desired height, and thus it is not necessary to provide several types of the auxiliary weirs 23 that have different heights from one another.

Figure 11:
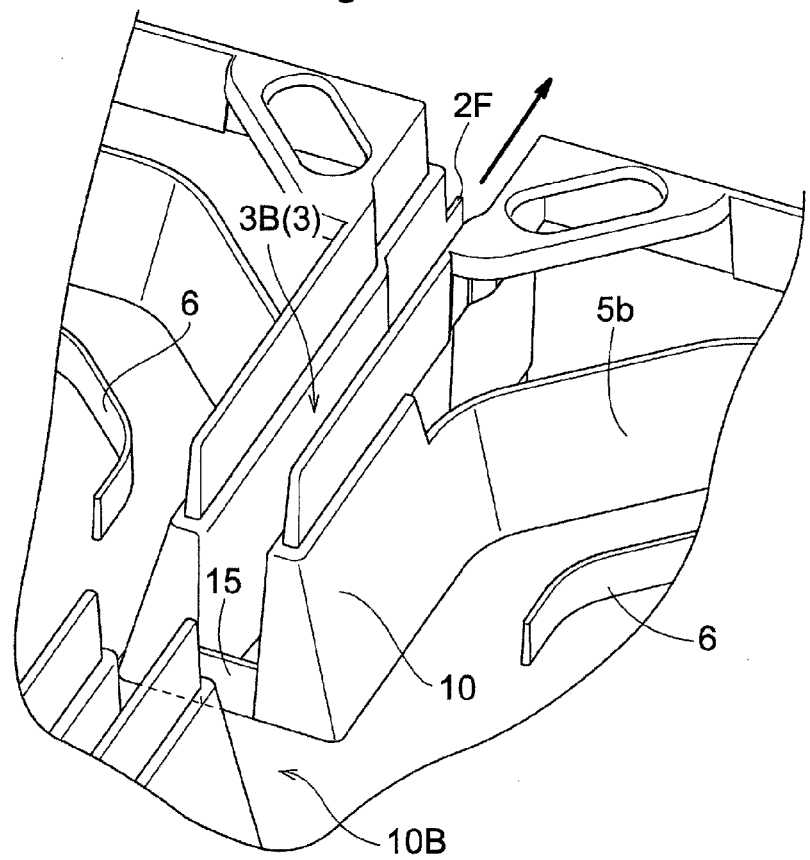
FIG. 11 is a perspective view of another specific portion of FIG. 9.

<8> When the plant cultivation container 1 is placed on the floor face with a relatively steep slope, in order to suppress deficiency of the pooled water in the downstream water reservoir container 5 as compared with the upstream water reservoir container 5, as shown in FIGS. 9 and 11, the second opening 10B on the downstream side alone may be provided with a weir member 15 with a relatively low height. Alternatively, the weir member 15 may be provided as option member, which is press-engageable between the right and left partition walls 10 constituting the second opening 10B, and removable therefrom when unnecessary. In addition, several types of the weir members 15 that have different height from one another may be provided as option member.

INDUSTRIAL APPLICABILITY

The present invention is applicable as plant cultivation container including a water reservoir portion for pooling the plant cultivation water, the water reservoir portion having a bed material accommodation part for placing the water-absorbing plant cultivation bed material in the water reservoir portion, wherein there is no need to provide a special feed-water tube made of a porous material and the plant cultivation bed material can be permeated satisfactorily in a short time period.

REFERENCE SIGNS LIST

S Moisture sensor
X Axis
1 Plant cultivation container
2A Water inlet
2B Water outlet
2F Slice
3 Feed-discharge channel
3A First channel
3B Second channel
3D Second weir member
4 Plant cultivation section
5 Water reservoir container (water reservoir portion)
7 Bed material accommodation part
8 Surrounding feed-water channel
8D First weir member
10 Partition wall
10A First opening
10B Second opening
11 Connection opening
11D Third weir member
12 Engaging portion
20 Plant cultivation bed material
20A Lower bed material
20B Upper bed material
23 Auxiliary weir

The invention claimed is:

1. A plant cultivation container comprising:
a water reservoir portion for pooling plant cultivation water, the water reservoir portion having a bed material accommodation part for placing a water-absorbing plant cultivation bed material; and
a surrounding feed-water channel that is defined between a circumferential wall face of the water reservoir portion and plate-shaped projections positioned radially inward of the circumferential wall face of the water reservoir portion, wherein the surrounding feed-water channel surrounds an entire circumference of the bed material accommodation part,
a feed-discharge channel, which supplies the plant cultivation water from outside to the water reservoir portion and discharges the plant cultivation water in the water reservoir portion to the outside, is provided in communication with the surrounding feed-water channel, and
the surrounding feed-water channel is provided with a first weir member that extends between one of the plate-shaped projections and the circumferential wall face of the water reservoir portion to block a passage of the water-feed channel, thereby preventing the plant cultivation water from entering the feed-water channel in a first direction and redirecting incident plant cultivation water to enter the feed-water channel in a second direction that is opposite the first direction.

2. The plant cultivation container according to claim 1, wherein the feed-discharge channel is in a shape of a groove disposed next to one side of the water reservoir portion.

3. The plant cultivation container according to claim 2, further comprising: a second weir member for dividing the feed-discharge channel into a first channel on an upstream side and a second channel on a downstream side in a water flow direction; and a partition wall for partitioning the feed-discharge channel and the water reservoir portion, wherein
in the partition wall, a first opening for allowing the first channel of the feed-discharge channel to communicate with an upstream side of the surrounding feed-water channel and a second opening for allowing the second channel of the feed-discharge channel to communicate with a downstream side of the surrounding feed-water channel are formed at a distance from each other.

4. The plant cultivation container according to claim 2, wherein the water reservoir portion is formed of two water reservoir portions arranged side by side so that the water reservoir portions are opposed across the feed-discharge channel.

5. The plant cultivation container according to claim 2, wherein a plurality of the water reservoir portions are arranged adjacent to each other along the feed-discharge channel, and between the adjacent water reservoir portions, a third weir member for pooling the plant cultivation water is provided.

6. The plant cultivation container according to claim 5, further comprising: a second weir member for dividing the feed-discharge channel into a first channel on an upstream side and a second channel on a downstream side in a water flow direction; and a partition wall for partitioning the feed-discharge channel and the water reservoir portion, wherein
in the partition wall, a first opening for allowing the first channel of the feed-discharge channel to communicate with the water reservoir portion on the upstream side and a second opening for allowing the second channel of the feed-discharge channel to communicate with the surrounding feed-water channel on the downstream side are formed.

7. The plant cultivation container according to claim 6, wherein a weir member for pooling the plant cultivation water in the water reservoir portion on the downstream side is provided between the second opening and the second channel.

8. The plant cultivation container according to claim 5, further comprising an engaging portion for additionally and removably attaching an auxiliary weir at a position adjacent to the third weir member on an upstream side or downstream side thereof.

* * * * *